United States Patent
Jodra et al.

(10) Patent No.: US 8,964,245 B2
(45) Date of Patent: Feb. 24, 2015

(54) COLOR PLANE REGISTRATION ERROR MEASUREMENT

(75) Inventors: Rodolfo Jodra, Boise, ID (US); Oren Bengigi, Bazkeret Batya (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 627 days.

(21) Appl. No.: 12/872,429

(22) Filed: Aug. 31, 2010

(65) Prior Publication Data

US 2012/0050758 A1 Mar. 1, 2012

(51) Int. Cl.
*H04N 1/50* (2006.01)

(52) U.S. Cl.
CPC .................... *H04N 1/506* (2013.01)
USPC ......................................................... 358/1.9

(58) Field of Classification Search
CPC ..................................................... H04N 1/506
USPC ............... 358/1.9, 1.5; 347/1.16, 19
See application file for complete search history.

(56) References Cited

U.S. PATENT DOCUMENTS

| | | | |
|---|---|---|---|
| 6,008,826 A * | 12/1999 | Foote et al. .................... | 347/116 |
| 6,194,109 B1 | 2/2001 | Lawton | |
| 6,373,513 B1 | 4/2002 | Tanuma et al. | |
| 6,454,390 B1 | 9/2002 | Takahashi et al. | |
| 6,829,456 B2 | 12/2004 | Regimbal et al. | |
| 7,630,672 B2 | 12/2009 | Baretsky et al. | |
| 7,679,630 B2 | 3/2010 | Sagi et al. | |
| 2005/0001871 A1* | 1/2005 | Ioka ................................ | 347/19 |
| 2007/0153340 A1* | 7/2007 | Itagaki et al. ................. | 358/504 |
| 2008/0131151 A1 | 6/2008 | Tamaoki | |
| 2009/0231374 A1 | 9/2009 | Van de Wynckel et al. | |

* cited by examiner

*Primary Examiner* — Tammy Pham
*Assistant Examiner* — Bharatkumar Shah
(74) *Attorney, Agent, or Firm* — Dicke, Billig & Czaja, PLLC (PAT); Scott Lund

(57) ABSTRACT

A color plane registration error method and system include printing a plurality of predetermined patterns of dots, each predetermined pattern having the respective dots arranged symmetrically around a common center of gravity. The center of gravity of each of the printed patterns and the distances between centers of gravity of respective patterns are determined to measure the color plane registration error.

17 Claims, 3 Drawing Sheets

COLOR PLANE REGISTRATION ERROR MEASUREMENT

BACKGROUND

Many color printing technologies, in particular high speed printers, require that pixels of different colors be properly aligned with each other. Color plane registration (CPR) error can cause visible print artifacts if the error is greater than some threshold level, for instance, 50 microns. Although printers are manufactured to minimize CPR error, it tends to vary over time and when printing conditions change, such as when printing on different types of paper.

It is thus necessary to measure CPR error during the printing operation and adjust the printing process as necessary. Some CPR error measurement methods are manual. For example, one CPR error measurement method prints several lines with known offsets. An operator manually checks which lines are aligned with each other to determine the error.

To eliminate human intervention and associated innacuracies, other methods to measure CPR errors are automated. For instance, a combination of marks are printed, and an imaging device, such as a scanner or camera, captures an image of the printed marks. The image is then analyzed to determine the CPR error. The distance between printed marks or the optical density of the printed marks can be measured to determine CPR error, for example.

However, the imaging system for capturing the printed marks can introduce errors that in turn reduce the accuracy of the CPR error determination. For example, the imaging system that captures the image of the printed marks can introduce scaling and image skew errors, which are proportional to the distance between the features analyzed. Imperfections in the printed page can change the measured position of the printed mark. Variations in the image's background reflectance can adversely affect accuracy of optical density measurements. Further, to obtain the desired accuracy, such methods require a high resolution image, requiring a high resolution imaging scanner, which can add complexity and cost to the printing system.

DETAILED DESCRIPTION

In the following detailed description, reference is made to the accompanying drawings which form a part hereof, and in which is shown by way of illustration specific disclosed embodiments. In this regard, directional terminology, such as "top," "bottom," "front," "back," "leading," "trailing," etc., is used with reference to the orientation of the Figure(s) being described. Because disclosed components can be positioned in a number of different orientations, the directional terminology is used for purposes of illustration and is in no way limiting. It is to be understood that other embodiments may be utilized and structural or logical changes may be made without departing from the scope of the disclosure. The following detailed description, therefore, is not to be taken in a limiting sense, and the scope of the present invention is defined by the appended claims.

Figure 1:
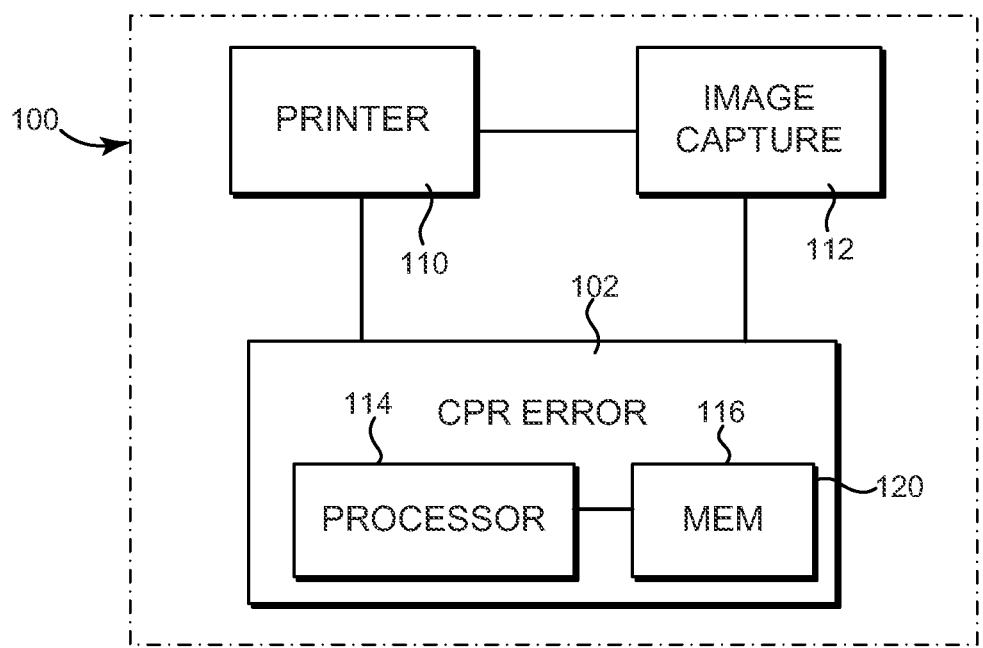
FIG. 1 is a block diagram conceptually illustrating an example of a printing system.

FIG. 1 conceptually illustrates an example of a printing system 100, including a printer 110, an image capture device 112 such as a scanner and a color plane registration (CPR) error module 102. The CPR error module 102 includes a processor 114 and a memory device 116 accessible by the processor 114. The CPR error module is configured to implement a method for determining CPR error. The various functions, processes, methods, and operations performed or executed by the CPR error module 102 can be implemented as program instructions (also referred to as software or simply programs) that are executable by the processor 114, which could be any of various types of computer processors, controllers, central processing units, microprocessors, digital signal processors, state machines, programmable logic arrays, and the like. In some implementations, the printing system 100 may be networked (using wired or wireless networks) with other systems, and the components of the system 100 may be local to the printer 110 and image capture device 112 or coupled thereto via a network.

In various implementations, program instructions may be stored on the memory 116, which could be any non-transient computer-readable medium for use by or in connection with any computer-related system or method. A computer-readable medium can be an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type.

Figure 2:
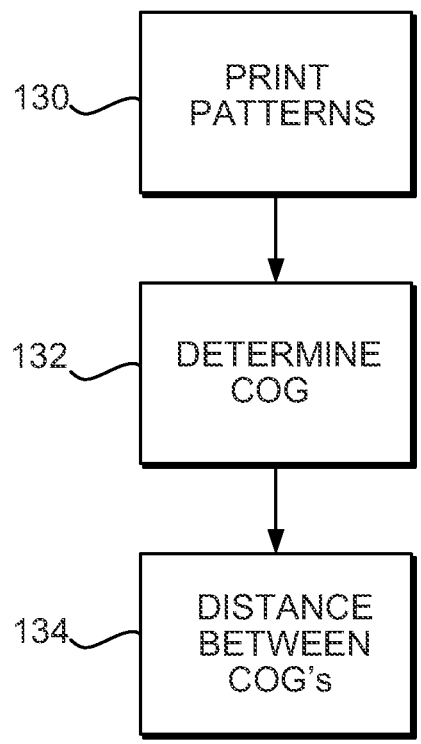
FIG. 2 is a flow diagram illustrating an example of a color plane registration error measurement method.

FIG. 2 is a flow diagram generally illustrating an example of an implementation of the CPR error measurement method. In block 130, the printer 110 prints a plurality of predetermined patterns of dots. Each of the predetermined patterns has its respective dots arranged symmetrically around a common center of gravity. In certain embodiments, the patterns are printed in different colors, such that each color in the system 100 has a respective predetermined pattern. In block 132, the center of gravity of each of the printed patterns is determined, and in block 134 the distances between the centers of gravity of respective patterns are determined. The CPR error can be calculated based on the distances between centers of gravity. The determined distances between centers of gravity can be averaged as part of the process illustrated in block 134 to improve accuracy. An image of the printed patterns from block 130 can be captured by the image capture device 112, which is received by the CPR error module 102 and analyzed to determine the distances between centers of gravity and corresponding CPR error.

Figure 3:
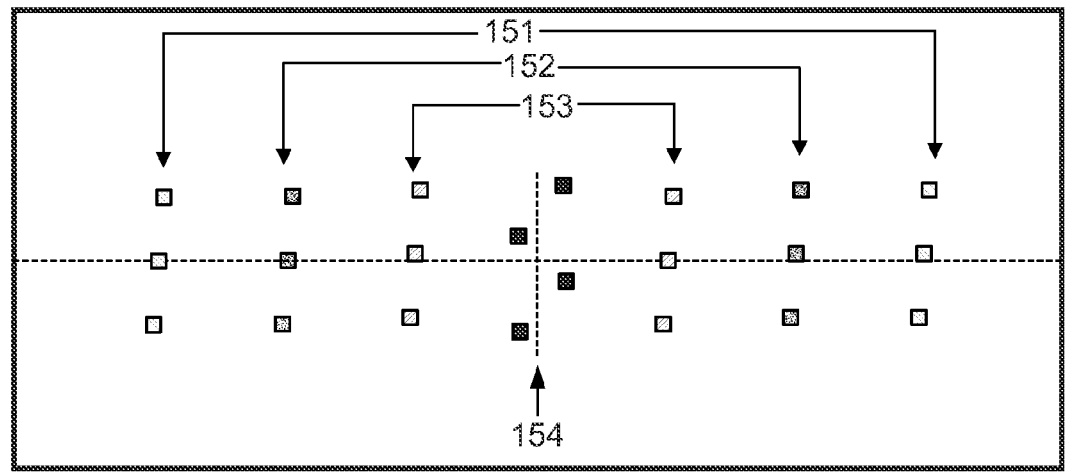
FIG. 3 illustrates an example of printed patters for CPR error measurement.

FIG. 3 illustrates an example of a plurality of printed patterns for a computer system that prints with four ink colors, cyan (C), magenta (M), yellow (Y) and black (K). Four patterns 151, 152, 153, 154 are printed corresponding to each of the four colors of the printer. Image capture devices, such as scanners, can introduce scaling and image skew errors, which are proportional to the distance between the features analyzed. As illustrated in FIG. 3, the centers of gravity of the patterns 151, 152, 153, 154 overlap, so the nominal measured distance between centers of gravity is zero. Since the location errors are proportional to the measured distance, the errors will be a small fraction of the actual distance measurement. In this manner, the patterns illustrated in FIG. 3 are insensitive to scaling and skew introduced by the scanner.

Imaging systems can further introduce random errors. Transfer defects distort the shape of the dots and thus modify the center of gravity of the printed feature, and image noise can affect the center of gravity of the feature when detected on the image. To minimize the impact of such random errors, measurements from a large number of patterns are averaged in some implementations. Since the CPR errors vary slowly across the page, an average over a reasonable area, for example, 20 mm, can produce a better estimation of the error within that area. In certain implementations, the patterns are very small—a few millimeters on each side—to make the average possible, In some embodiments, some of the printed patterns are excluded from the CPR error determination based on predetermined criteria. For example, detection of individual dots can be unreliable, especially when the dots are very small. Dots can be lost, and stray dots can appear in the captured image of the printed patterns. In disclosed embodiments, the detection is robust because the patterns are made up of a plurality of dots, and the relative positions are very accurate. Stray dots can be ignored because they are not located at the expected locations. If dots are missing from an analyzed pattern, that pattern can be excluded from the CPR error measurement since there are other patterns available for analysis and measurement.

Figure 4:
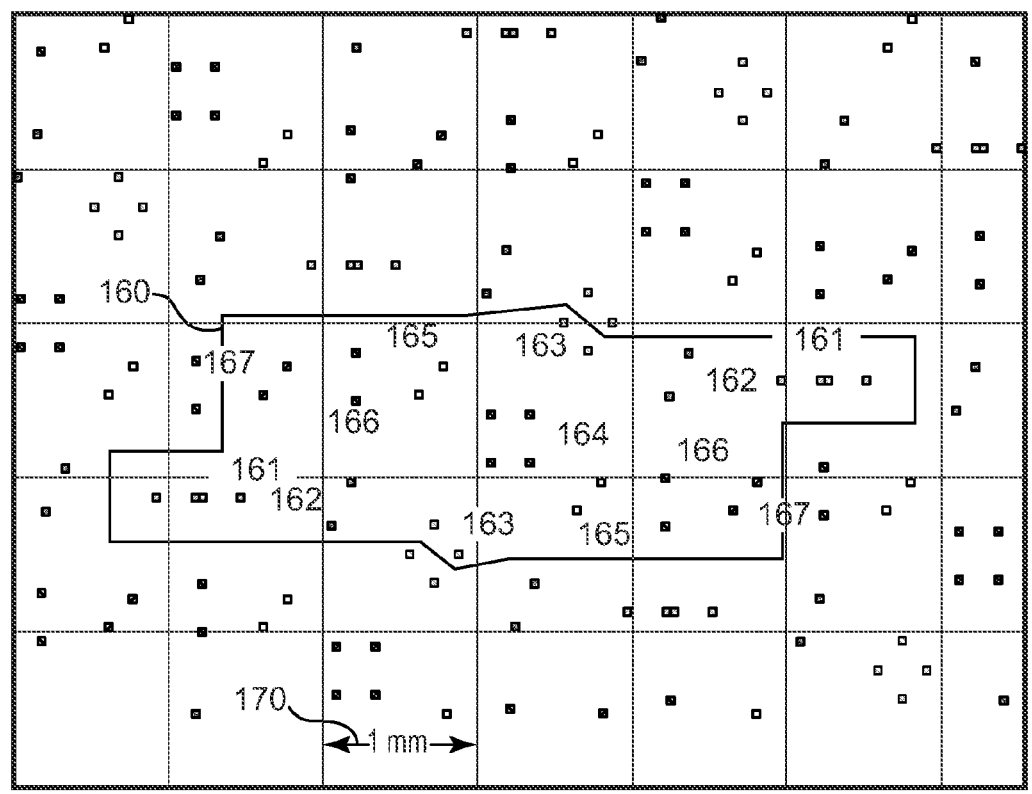
FIG. 4 illustrates another example of printed patters for CPR error measurement.

As noted in conjunction with FIG. 2, in some embodiments each predetermined printed pattern is a combination of several dots. The patterns all share the same center of gravity, and the patterns are small so that a large number of them fit in an area a few millimeters square. FIG. 4 illustrates portion of a printed page showing an example of printed patterns for seven color separations. Accordingly, seven different patterns 161, 162, 163, 164, 165, 166, 167 are printed corresponding to each of the seven color separations. The patterns are repeated across the entire page, with reference 160 indicating a cell of patterns under consideration.

The patterns are designed such that the distance between patterns is large enough so that they don't overlap when the patterns move relative to each other, for instance, due to errors caused by the imaging process. The larger this overlap distance, the higher the dynamic range of the measurements. Further, the patterns must be kept small. FIG. 4 includes a reference 170 indicating a 1 mm distance.

Generally, identifying the dots that make up the pattern is easier if the dots have high contrast, and when the contrast of all of the dots is similar. The ideal solution would be printing all the dots with black ink, but since that is not possible, cyan and magenta inks are used in some implementations because cyan and magenta have similar optical density. CPR errors can be affected by ink coverage on the page. Accordingly, in some implementations inked areas are included on the page between the measured areas.

Figure 5:
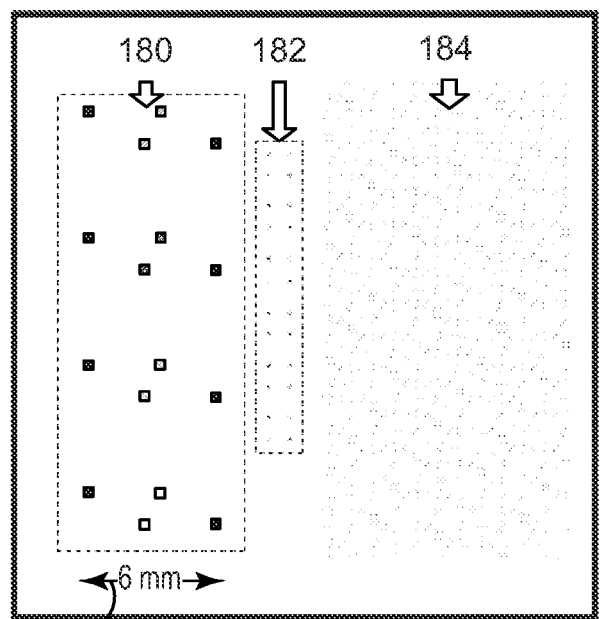
FIG. 5 illustrates an example of a portion of a measurement page for CPR error measurement.

In the initial stages of calibration when the image alignment state is unknown, CPR errors can be large, for example, exceeding 200 microns. FIG. 5 illustrates an example of a measurement page that includes multiple patterns for each color separation used to detect large CPR errors. The page illustrated in FIG. 5 includes several areas of patterns printed on the page, with each area having patterns of dots for each of the printer's color separations. Thus, in the example illustrated in FIG. 5 the test page includes first, second and third a rough pattern 180, a coarse pattern 182 and a fine pattern 184.

Reference 186 indicates a distance of 6 mm. The rough pattern supports errors up to 6 mm, the coarse pattern 182 supports errors up to 0.8 mm, and the fine pattern 184 supports errors up to 0.2 mm.

Thus, the errors determined using the fine, coarse and rough patterns 180, 182, 184 are evaluated. The fine errors are more accurate, but offer less dynamic range. If the rough errors exceed a certain predefined range, the measured CPR error is extracted from the rough pattern 180. Otherwise, if the coarse errors exceed another predefined range, the measured CPR error is extracted from the coarse pattern 182. The fine pattern 184 measurement is only used when the error is small.

Figure 6:
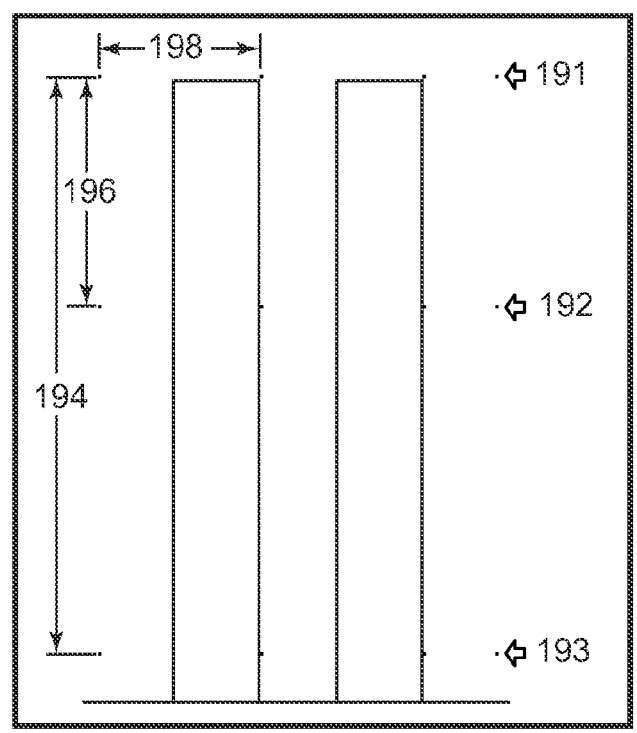
FIG. 6 illustrates an example of a test page having fiducial marks for CPR error measurement.

In some embodiments, fiducial marks are printed on the test page and used by the CPR error module 102 to Identify the location of the patterns within the image, and to align images captured by the different capture devices. FIG. 6 illustrates an example of a test page having three rows of fiducial marks 191, 192, 193. In certain implementations, the top and bottom fiducial marks 191, 193 are used as reference when analyzing a page that is 17 inches tall or longer. The middle fiducial mark 192 is provided for use in analyzing pages 8.5 inches long. From each fiducial mark, the coarse errors are evaluated at two columns and the fine errors are evaluated at three columns. Reference 194 indicates a fiducial vertical distance of 410 mm and reference 196 indicates a fiducial vertical distance of 164 mm. Reference 198 indicates a fiducial horizontal distance of 115 mm.

In some implementations, the CPR error module 102 is configured to measure CPR error using the captured image based on three broad steps: binarization of the image using an adaptive threshold, identification of contiguous pixels forming a cluster, and pattern matching to identify the patterns.

A threshold separates the printed pixels from the background. However, in practice the illumination level can vary across the page. This variability is caused, for example, by changes in the paper illumination angle during the image capture process and thus cannot be avoided. To deal with this problem in the binarization process, the threshold is adaptive, defined over a small area of the image. Generally, some of the black pixels are excluded, since in some implementations, the image capture device 114 occasionally can insert some very dark pixels.

Identifying contiguous pixels that form a cluster includes grouping pixels above a threshold into clusters. These clusters are analyzed to determine whether each cluster is acceptable for use in the CPR error determination. Examples of criteria used for cluster include the width and height of the cluster and the ratio between the total area in the cluster, and the number of pixels within the area that belong to the cluster.

A pattern is made up of clusters situated at certain distances from each other. One of the clusters is designated as the "reference cluster," and the positions of the other clusters are defined as an offset from the reference cluster.

The CPR measurement error is the distance between the centers of gravity of the patterns. Some sections of the page could contain weak dots, or severe artifacts which obfuscate the target patterns, preventing satisfactory measurement. In such instances, the measurement errors can be interpolated from other nearby positions.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for measuring color plane registration error, comprising:
    printing a plurality of separate patterns, the plurality of separate patterns having a center of gravity common to the plurality, each of the separate patterns including a plurality of separate dots, and respective dots of each of the separate patterns being arranged symmetrically around the common center of gravity of the plurality of separate patterns;
    capturing an image of the printed separate patterns;
    from the captured image and for each of the printed separate patterns, determining a respective location of a respective center of gravity of a respective printed separate pattern; and
    determining physical distances between the respective locations of the respective centers of gravity of the respective printed separate patterns.

2. The method of claim 1, wherein the separate patterns are printed in separate colors.

3. The method of claim 1, further comprising averaging the determined physical distances between the respective locations of the respective centers of gravity of the respective printed separate patterns.

4. The method of claim 1, further comprising printing the separate patterns at different distances from the common center of gravity.

5. The method of claim 1, further comprising excluding selected patterns from a color plane registration error determination based on predetermined criteria.

6. The method of claim 1, wherein the printed separate patterns repeat across a test page.

7. The method of claim 2, further comprising printing a plurality of separate patterns for each of the separate colors.

8. A printing system, comprising
    a printer;
    an image capture device; and
    a color plane registration (CPR) error module configured to
        receive an image from the image capture device, the image having been printed by the printer and including a plurality of different patterns, the plurality of different patterns having a center of gravity common to the plurality, each of the different patterns including a plurality of different dots, and respective dots of each of the different patterns being arranged symmetrically around the common center of gravity of the plurality of different patterns;
        from the image and for each of the printed different patterns, determine a respective location of a respective center of gravity of a respective printed different pattern; and
        determine physical distances between the respective locations of the respective centers of gravity of the respective printed different patterns.

9. The printing system of claim 8, wherein the printer is a color printer configured to print a plurality of different colors, and wherein the image received by the CPR error module includes different patterns printed for each of the different colors.

10. The printing system of claim 8, wherein the CPR error module is configured to average the determined physical distances between the respective locations of the respective centers of gravity of the respective printed different patterns.

11. The printing system of claim 8, wherein the printed different patterns in the image received by the CPR error module repeat across a test page.

12. The printing system of claim 8, wherein the printed different patterns in the image received by the CPR error module include fiducial marks to identify the locations of the printed different patterns within the image.

13. The printing system of claim 8, wherein the printed different patterns include a rough pattern, a course pattern and a fine pattern.

14. A non-transient storage medium including program instructions for implementing a method for measuring color plane registration error, comprising:
    receiving an image including a plurality of distinct patterns, the plurality of distinct patterns having a center of gravity common to the plurality, each of the distinct patterns including a plurality of distinct dots, and respective dots of each of the distinct patterns being arranged symmetrically around the common center of gravity of the plurality of distinct patterns;
    from the image and for each of the printed distinct patterns, determining a respective location of a respective center of gravity of a respective printed distinct pattern; and
    determining physical distances between the respective locations of the respective centers of gravity of the respective printed distinct patterns.

15. The method of claim 1,
    wherein printing a plurality of separate patterns includes printing a first pattern having a first plurality of dots, and printing a second pattern having a second plurality of dots, the first plurality of dots of the first pattern arranged symmetrically around the common center of gravity, and the second plurality of dots of the second pattern arranged symmetrically around the common center of gravity,
    wherein determining a respective location of a respective center of gravity includes determining a first location of a first center of gravity of the first pattern, and determining a second location of a second center of gravity of the second pattern,
    wherein determining physical distances between the respective locations of the respective centers of gravity includes determining a physical distance between the first location of the first center of gravity of the first pattern and the second location of the second center of gravity of the second pattern.

16. The printing system of claim 8,
    the image including a first pattern having a first plurality of dots and a second pattern having a second plurality of dots, the first plurality of dots of the first pattern arranged symmetrically around the common center of gravity, and the second plurality of dots of the second pattern arranged symmetrically around the common center of gravity,
    the CPR error module configured to
        determine a first location of a first center of gravity of the first pattern, and determine a second location of a second center of gravity of the second pattern,
        determine a physical distance between the first location of the first center of gravity of the first pattern and the second location of the second center of gravity of the second pattern.

17. The non-transient storage medium including program instructions for implementing a method for measuring color plane registration error of claim 14,
    wherein receiving an image including a plurality of distinct patterns includes receiving an image including a first pattern having a first plurality of dots and a second pattern having a second plurality of dots, the first plurality of dots of the first pattern arranged symmetrically around the common center of gravity, and the second plurality of dots of the second pattern arranged symmetrically around the common center of gravity, wherein determining a respective location of a respective center of gravity includes determining a first location of a first center of gravity of the first pattern, and determining a second location of a second center of gravity of the second pattern, wherein determining physical distances between the respective locations of the respective centers of gravity includes determining a physical distance between the first location of the first center of gravity of the first pattern and the second location of the second center of gravity of the second pattern.

* * * * *

UNITED STATES PATENT AND TRADEMARK OFFICE
CERTIFICATE OF CORRECTION

PATENT NO.         : 8,964,245 B2
APPLICATION NO.    : 12/872429
DATED              : February 24, 2015
INVENTOR(S)        : Rodolfo Jodra et al.

It is certified that error appears in the above-identified patent and that said Letters Patent is hereby corrected as shown below:

On the title page, item 75, Inventors, in column 1, line 2, delete "Bazkeret Batya" and insert -- Mazkeret Batya --, therefor.

Signed and Sealed this
Fifth Day of July, 2016

Michelle K. Lee
*Director of the United States Patent and Trademark Office*